United States Patent

Pease et al.

(10) Patent No.: US 6,707,231 B2
(45) Date of Patent: Mar. 16, 2004

(54) METHOD AND APPARATUS FOR CONTROLLING A PIEZO ACTUATOR

(75) Inventors: John Pease, Santa Clara, CA (US); Sherwin D. Cabatic, Mountain View, CA (US); Dennis E. Melvin, Santa Clara, CA (US)

(73) Assignee: New Focus, Inc., San Jose, CA (US)

( * ) Notice: Subject to any disclaimer, the term of this patent is extended or adjusted under 35 U.S.C. 154(b) by 0 days.

(21) Appl. No.: 10/202,945

(22) Filed: Jul. 24, 2002

(65) Prior Publication Data

US 2002/0190606 A1 Dec. 19, 2002

Related U.S. Application Data

(62) Division of application No. 09/706,369, filed on Nov. 3, 2000, now Pat. No. 6,476,537.
(60) Provisional application No. 60/163,329, filed on Nov. 3, 1999.

(51) Int. Cl.⁷ .......................... H01L 41/18; H01L 41/06; H01L 41/04; H01L 41/08; H02N 2/00
(52) U.S. Cl. ...................... 310/317; 310/318; 310/319; 310/322; 310/323.01; 310/328; 310/316.01
(58) Field of Search .......................... 310/317, 316.01, 310/318, 319, 328, 322, 323.01; 324/649, 600–727

(56) References Cited

U.S. PATENT DOCUMENTS

| | | | | |
|---|---|---|---|---|
| 4,549,533 A | * | 10/1985 | Cain et al. .................. 370/400 |
| 4,575,654 A | * | 3/1986 | Basch ........................ 310/318 |
| 5,543,670 A | * | 8/1996 | Luecke ........................ 310/26 |
| 5,645,260 A | * | 7/1997 | Falangas ..................... 248/550 |
| 5,696,420 A | * | 12/1997 | Inanaga et al. ......... 310/316.01 |
| 5,805,448 A | * | 9/1998 | Lindsay et al. ............... 700/71 |
| 6,038,924 A | * | 3/2000 | Lee et al. ................. 73/514.34 |
| 6,115,204 A | * | 9/2000 | Yokomachi et al. ...... 360/77.16 |
| 6,249,093 B1 | * | 6/2001 | Takahata et al. ............ 318/129 |
| 6,476,537 B1 | * | 11/2002 | Pease et al. ................. 310/317 |

* cited by examiner

*Primary Examiner*—Thomas M. Dougherty
*Assistant Examiner*—Julio C. Gonzalez R.
(74) *Attorney, Agent, or Firm*—IP Creators; Charles C. Cary

(57) ABSTRACT

A method and apparatus for controlling a piezo-electric actuator coupled to a driven member is disclosed. The piezo-electric actuator is responsive to waveforms with asymmetrical voltage/current profiles on the rising and falling edge to effect consistent and cumulative movement of the driven member in one of two directions throughout the reciprocations of the piezo-electric actuator. The waveforms are digitally generated from a stored set of numbers or a function for generating the set of numbers. The numbers correspond with the discrete digital values associated with the desired waveforms for moving the driven member in either of at least two directions. The controller may be used to drive more than one piezo-electric actuator. The controller may include responsiveness to a feedback of the position of the driven member to accurately position the driven member. The controller may also include the ability to update the function or values stored in memory so as to couple more efficiently with new or existing actuators. The controller exhibits a relatively smaller form factor and reduced complexity when compared with prior art analog drivers.

8 Claims, 6 Drawing Sheets

METHOD AND APPARATUS FOR CONTROLLING A PIEZO ACTUATOR

CROSS-REFERENCE TO RELATED APPLICATION

This is a divisional application of prior application Ser. No. 09/706,369 filed on Nov 3, 2000 now U.S. Pat. No. 6,476,537 and entitled "Method and Apparatus for Controlling A Piezo Actuator" which application claims the benefit of priority to Provisional Application No. 60/163,329, filed Nov. 3, 1999, entitled "PICO Motor Driver" the disclosures of which are incorporated herein by reference for all purposes.

BACKGROUND OF THE INVENTION

1. Field of the Invention

This invention generally relates to controllers for electromechanical actuators and more particularly to controllers for piezoelectric elements.

2. Description of the Related Art

Piezo-electric actuators are used in for positioning elements in a wide range of applications. In optical test and measurement they are used for positioning of lenses, filters, polarizers, mirrors, radiation sources, detectors or a stage to which any of the aforementioned may be attached. In cameras piezo-electric actuators are used for focusing lenses.

Typically such actuators have opposing ends, one of which is fixed and the other of which is frictionally coupled with a driven member, e.g. lens. As voltage is applied to the piezo-electric actuator an expansion or contraction of the actuator takes place. Since one end of the piezo-electric actuator is fixed the expansion or contraction of the actuator causes a corresponding movement of the driven member to which it is frictionally connected. Above some threshold rate of expansion or contraction the force of the frictional coupling between the actuator and the driven member is insufficient to overcome the inertia of the driven member and there is slippage or in the extreme no movement of the driven member. By driving the piezo-electric actuator with waveforms with asymmetrical voltage/current profiles on the rising and falling edge it is possible to effect consistent and cumulative movement of the driven member in one of two directions throughout the reciprocations of the piezo-electric actuator.

U.S. Pat. No. 5,394,049 entitled "Piezoelectric Actuator for Optical Alignment Screws Cross References to Co-Pending Applications" issued on Feb. 28, 1995 and U.S. Pat. No. 5,410,206 entitled "Piezoelectric Actuator for Optical Alignment Screws" issued on Apr. 25, 1995, U.S. Pat. No. 6,092,431 and entitled "Rotary type driving device employing electromechanical transducer and apparatus provided with the rotary type driving device" issued on Jul. 25, 2000 and U.S. Pat. No. 6,111,336 entitled "Driving apparatus using transducer" issued on Aug. 29, 2000 each disclose piezo-electric actuators which exhibit the above discussed principals. Each of these references is incorporated by reference as if fully set forth herein.

Each of these references discloses various analog drive mechanisms for delivering the asymmetrical waveforms to the piezo-electric actuator. These circuits rely on various analog components, e.g resistors, capacitors, current sources and sinks in conjunction with appropriate transistor switches to deliver the required waveform to the piezo-electric actuator. There are several problems which such circuits exhibit. First, they are complex and may require a large form factor. Second, the waveforms they generate are not consistent over time since they are generated using the time constants associated with resistor capacitor combinations or of fixed current sources.

What is needed is a drive circuit with reduced cost and complexity which delivers repeatable waveforms with the desired characteristics to the piezo-electric actuator.

SUMMARY OF THE INVENTION

The present invention provides a method and apparatus for controlling a piezo-electric actuator coupled to a driven member. The piezo-electric actuator is responsive to waveforms with asymmetrical voltage/current profiles on the rising and falling edge to effect consistent and cumulative movement of the driven member in one of two directions throughout the reciprocations of the piezo-electric actuator. The waveforms are digitally generated from a stored set of numbers or a function for generating the set of numbers. The numbers correspond with the discrete digital values associated with the desired waveforms for moving the driven member in either of at least two directions. The controller may be used to drive more than one piezo-electric actuator. The controller may include responsiveness to a feedback of the position of the driven member to accurately position the driven member. The controller may also include the ability to update the function or values stored in memory so as to couple more efficiently with new or existing actuators. The controller exhibits a relatively smaller form factor and reduced complexity when compared with prior art analog drivers.

In an embodiment of the invention a controller for controlling at least one piezo actuator is disclosed. The piezo actuator is coupled frictionally with at least one positioning member to move the positioning member in either of two directions as determined by relative rates of expansion and contraction of the piezo actuator. The controller includes a logic for generating digitized pulses and an digital-to-analog (A/D) converter. The logic includes the capability to generate digitized pulses each with a rising edge and a falling edge. The relative absolute values of the corresponding average slopes of the rising edge and the falling edge of each of the digitized pulses corresponds with a selected direction of movement of the at least one positioning member. The A/D converter includes an input coupled to the logic and an output coupled to the at least one piezo actuator. The A/D converter converts the digitized pulses at the input to an analog waveform at the output. This effects the movement of the positioning member in the selected direction.

In an alternate embodiment of the invention a method for controlling at least one piezo actuator is disclosed. The method for controlling comprises the acts of:

generating digitized pulses each with a rising edge and a falling edge and with relative absolute values of corresponding average slopes of the rising edge and the falling edge of each of the digitized pulses corresponding with a selected direction of movement of the at least one positioning member;

converting said digitized pulses to an analog waveform; and driving said at least one positioning member with said analog waveform to move sad at least one positioning member in the selected direction.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention provides a method and apparatus for controlling a piezo-electric actuator coupled to a driven member. The piezo-electric actuator is responsive to waveforms with asymmetrical voltage/current profiles on the rising and falling edge to effect consistent and cumulative movement of the driven member in one of two directions throughout the reciprocations of the piezo-electric actuator. The waveforms are digitally generated from a stored set of numbers or a function for generating the set of numbers. The numbers correspond with the discrete digital values associated with the desired waveforms for moving the driven member in either of at least two directions. The controller may be used to drive more than one piezo-electric actuator. The controller may include responsiveness to a feedback of the position of the driven member to accurately position the driven member. The controller may also include the ability to update the function or values stored in memory so as to couple more efficiently with new or existing actuators. The controller exhibits a relatively smaller form factor and reduced complexity when compared with prior art analog drivers.

Figure 1:
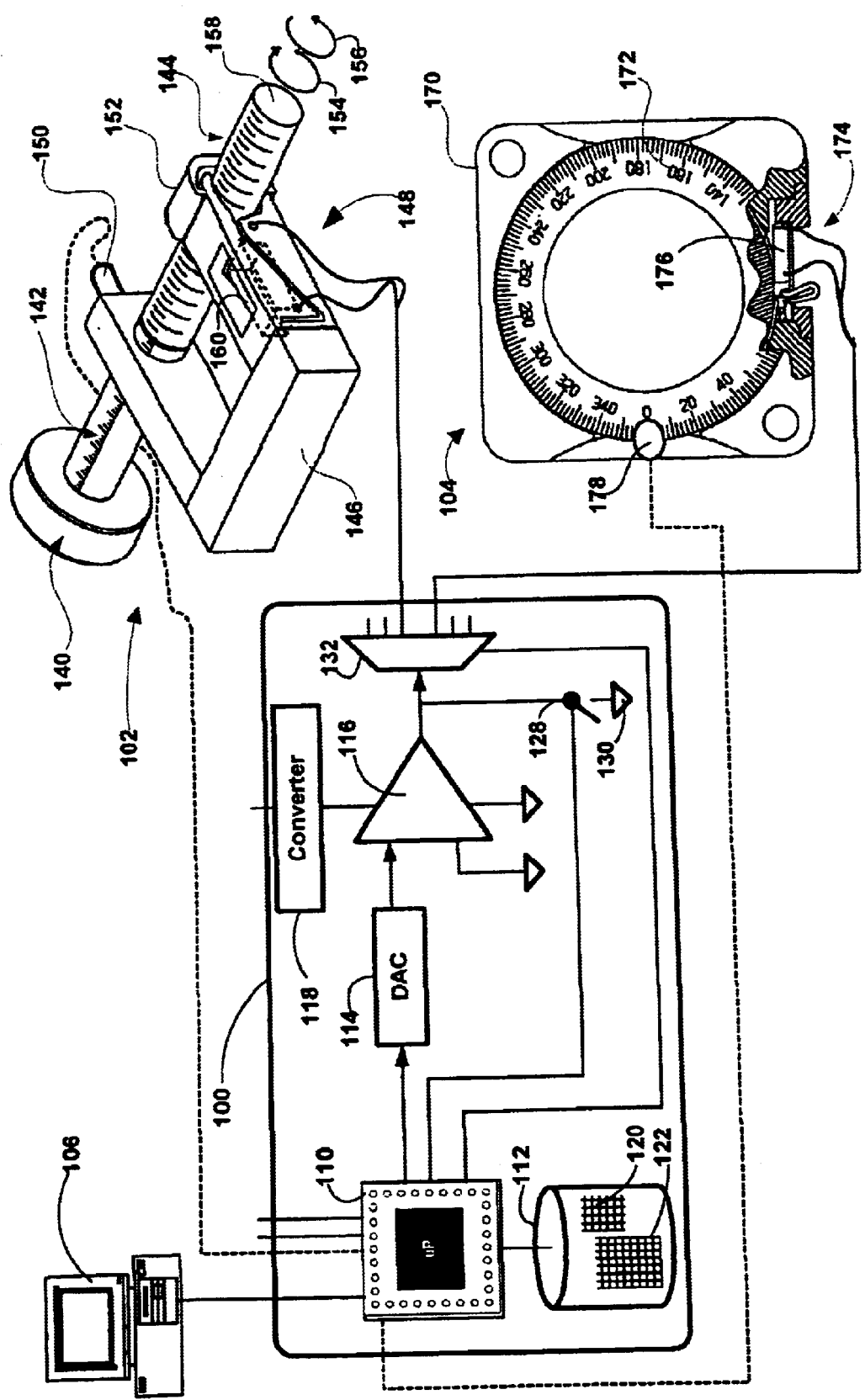
FIG. 1 is a hardware block diagram of a controller coupled to a plurality of piezo-electric actuators.

FIG. 1 is a hardware block diagram of a controller coupled to a plurality of piezo-electric assemblies. The controller 100 is shown coupled to a linear piezo-electric assembly 102 and a rotary piezo-electric assembly 104. The controller in this embodiment of the invention accepts input from a workstation 106. The workstation may be used to select one or both of the linear and rotary assemblies for activation. The workstation may also be used to input directional, or speed parameters for either of the piezo-electric assemblies. The workstation may also be used as a display device to display relative or absolute position parameters for the assemblies, as well as other control information.

In alternate embodiments of the invention input to the controller may be in the form of an analog signal the polarity of which indicates the desired direction of movement of the associated piezo-electric assembly. Alternately a digital input may be provided in which a first bit line selects the direction of motion and a second bit line the frequency at which waveforms are generated by the controller thereby governing the speed of the driven member of the piezo-electric assembly. In still another embodiment of the invention an input may be provided for triggering a single output waveform of either a forward or reverse type.

The controller 100 includes a processor 110, memory 112, a digital-to-analog converter (DAC) 114, an amplifier 116, a power converter 118, a multiplexer 132, and a switchable connection 128 to a current sink 130. Collectively the processor and memory form a logic for generating digitized pulses. The pulses may be generated by a reading by the processor of an ordered set of numerical values 122 stored in memory (See FIG. 2) or from a function stored in memory the execution of which by the processor results in the ordered set of numerical values. The operation of the processor may be controlled by program code 120 also stored in memory. The numerical values are output by the processor to the input of the DAC 114 where they are converted to a stepped analog waveform (See FIG. 3). The stepped analog waveform may be filtered and smoothed as it is passed to the input of the amplifier. The amplifier amplifies the analog waveform from the DAC to a range suitable for the associated piezo-electric assembly to which it is coupled via the multiplexer 132. Peak voltages of over 100 volts may be required to scale the waveform from the DAC to levels at which the desired motion of the driven member of either of the piezo-electric assemblies is achieved. The power supply to the amplifier 116 may include the converter 118 to boost a low voltage input to the required level for powering the amplifier. The output waveforms which correspond with opposite directions of motion in the driven members have substantially opposing symmetries in their leading and trailing edges (See FIG. 3). By driving the piezo-electric actuator with waveforms with asymmetrical voltage/current profiles on the rising and falling edge it is possible to effect consistent and cumulative movement of the driven member in one of two directions throughout the reciprocations of the piezo-electric actuator. When the driven member of the associated piezo-electric assembly is properly positioned switch 128 may be shorted to a current sink 130 to drain current from the piezo-electric actuator. This effect of this is to arrest further movement of the driven member by keeping the contraction rate of the piezo-electric actuator in the range at which slipping between the actuator and the driven member results.

Linear Piezo-Electric Assembly

The piezo-electric assembly 102 includes an actuator 148 a driven member 158, and a frame 146. The actuator has jaw elements (See FIG. 5) positioned about the driven member, e.g. a cylindrical shaft, which includes a threaded portion 144 passing through the jaws. The base of the piezoelectric actuator is affixed to the frame 146. For the purpose of this explanation, the inertial characteristics of the driven member are represented by the flywheel portion 140 at the head of the driven member 158. Where closed loop control of the position of the driven member is enabled position detector 150 operating with linear encoding 142 on the shank of the driven member provides position feedback to the controller 100.

When the electrical signal across piezo-electric element 160 is such that element extends relative longitudinal movements of jaw elements occurs. If there is no slippage between the jaws and driven member 158 rotation of the driven member takes place in the direction of arrow 154. As the amplitude of the electrical signal across piezoelectric element is reduced, contraction occurs, causing relative longitudinal movement of the jaw elements in the opposite direction. Again asswning that no slippage occurs between the jaws and driven member, rotation of driven member takes place in the direction of arrow 156. A spring clip 152 generates damping force of the opposing jaws on the threaded portion of the driven member.

Because of the inertia of the driven member 158, a rapidly rising or falling electrical signal will induce such rapid movement of the jaw elements that slippage between the jaws and the driven member will occur. The duration of slippage depends on the waveform and amplitude of the electrical signal applied across the piezoelectric element 160, as well as the mechanical characteristics of the system, such as the frictional engagement between the jaws and driven member, and the inertia of the driven member and other mechanical elements connected to it. Conversely, application of a slowly rising or falling signal across piezoelectric element wili cause a correspondingly slow longitudinal movement of the jaw elements, and very little or no slippage between the jaws and driven member will take place.

It follows that selective rotation of driven member 158 may be obtained in either direction 154–156 simply by applying a cyclic electrical signal having the proper waveform to the piezo-electric element 160. Thus, a waveform having a slowly rising leading edge followed by a rapidly falling trailing edge will cause rotation in a first direction. Conversely, a waveform having a rapidly rising leading edge followed by a slowly falling trailing edge will be effective to rotate the driven member in the opposite direction.

Rotary Piezo-Electric Assembly

The rotary piezo-electric assembly 104 is a rotary optical stage. It includes a piezoelectric element 176 mounted in a piezo-electric actuator 174 which is affixed to the base member 170 to which a driven member, e.g. rotary stage 172 is rotatably coupled. An optical element such as a diffraction grating, mirror, polarized, or similar device may be affixed to the rotary stage. Cut out portions in base member allow the rotatable stage member to be grasped by hand for manual rotation. A knurled portion on the top of rotary stage may be used in conjunction with scale on the top of rotatable stage member to achieve a coarse initial position. Where closed loop control of the position of the driven member is enabled position detector 178 operating with encoding on the rotary stage provides position feedback to the controller 100.

The piezoelectric element 176 has a first end which fits into a receptor portion of the base member 170 and second end which is affixed a drive pad which frictionally couples with the rotary stage. The reciprocating motion of the drive pad developed by the piezoelectric element is converted to rotary motion of the optical stage by moving the drive pad relatively slowly in a first direction such that the coefficient of friction between the drive pad and the rotatable optical stage overcomes the inertial and rotational friction of the rotatable optical stage, causing the moveable optical stage to rotate slightly. A relatively rapid rate of motion in a direction opposite the first direction results in slippage between the drive pad and the rotary stage thereby avoiding motion of the rotary stage with respect to the base 170. When the relative rates of motion are reversed the direction, i.e. counterclockwise or clockwise, of the rotary stage with respect to the base is reversed as well.

The linear or rotary assemblies discussed above may utilize a variety of position sensors, e.g. linear and rotary encoders, to provide absolute/relative position feedback.

Figure 2:
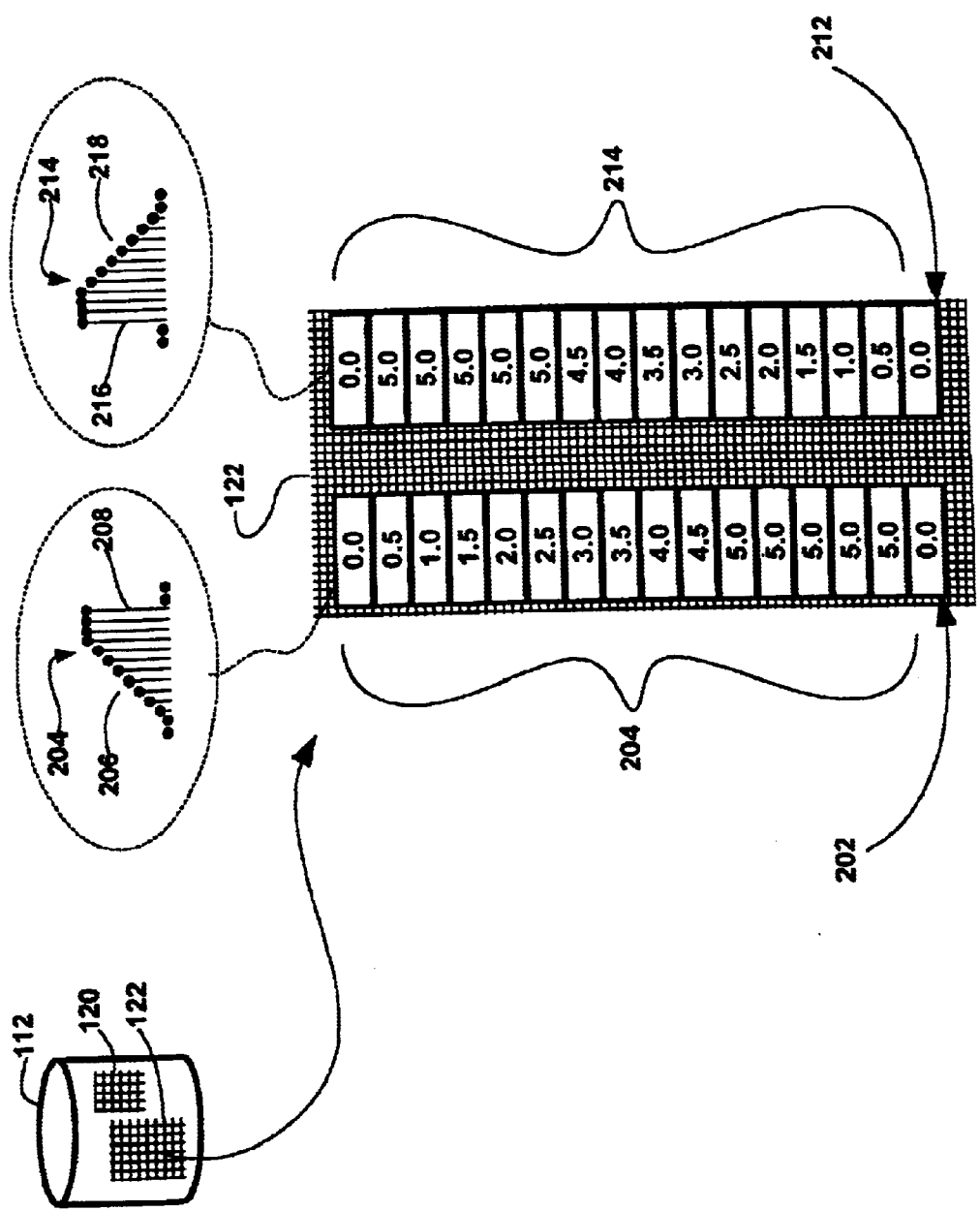
FIG. 2 shows an embodiment of the data structures from which the desired waveforms generated by the controller may be derived.

FIG. 2 shows an embodiment of the data structures from which the desired waveforms generated by the controller may be derived. In this embodiment of the invention two files 202 and 212 each including an ordered set of numbers 204 and 214 respectively are stored in memory 112. The ordered set 204 corresponds with a first pulse the leading edge 206 of which has a gradual slope and the trailing edge 208 of which has a steep slope. The relative absolute value of the average slope along the trailing edge exceeds that along the leading edge. A pulse resulting from this ordered sequence will correspond with a first of the two directions of motion of the driven member. The ordered set 214 corresponds with a second pulse the leading edge 216 of which has a steep slope and the trailing edge 218 of which has a gradual slope. The relative absolute value of the average slope along the trailing edge is less than that along the leading edge. A pulse resulting from this ordered sequence will correspond with a second of the two directions of motion of the driven member.

In alternate embodiments of the invention a single ordered sequence read in either top-down order or a bottom-up order may be sufficient to effect a selected one of the two possible directions of motion in the driven member. In still another embodiment of the invention a plurality of files may be stored in memory each corresponding to the optimal digital drive signal for an associated piezo-electric assembly. In still another embodiment of the invention the files may be updated with new digital values to activate a new piezoelectric assembly or to improve the efficiency of an existing assembly. In still another embodiment of the invention the data 122 stored in memory may be a function the execution of which by the processor 110 results in one or the other of the ordered sequences of numbers 204 and 214.

Figure 3:
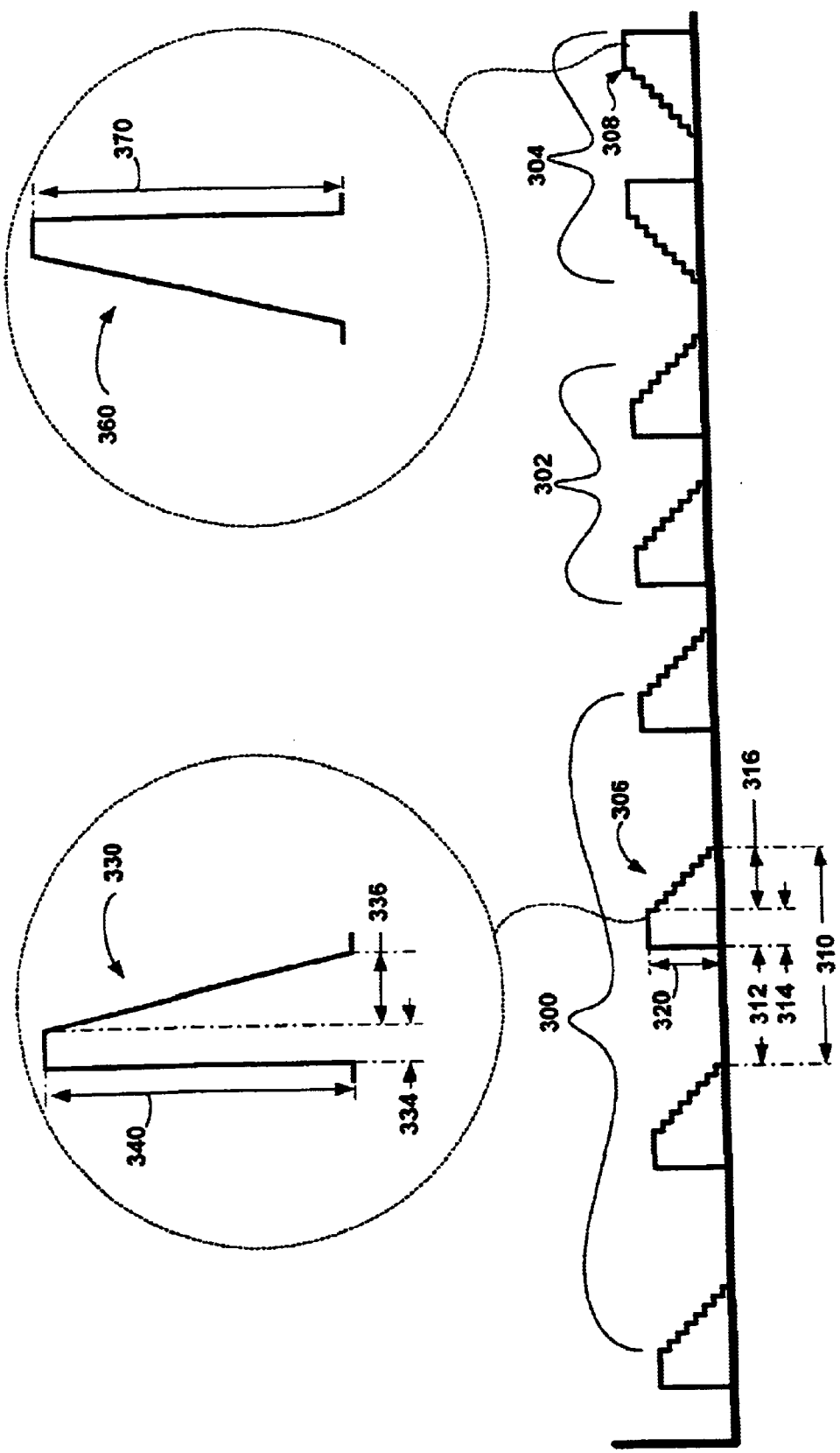
FIG. 3 is a signal diagram showing the discrete digital values corresponding with the desired waveforms, both after an D/A conversion and a subsequent amplification to the appropriate levels for driving the piezo-electric actuators.

FIG. 3 is a signal diagram showing the waveforms resulting from the ordered sequence of numbers after an D/A conversion and a subsequent amplification to the appropriate amplitudes for driving the piezo-electric actuators. Three pulse sequences are shown. The first two of these show a low frequency train of pulses 306. The second of these show an increase in the frequency of the pulses 306. Pulse 306 corresponds to the output of the D/A converter 114 (See FIG. 1) resulting from an input of the ordered sequence of numbers 214 shown in the previous FIG. 2. Pulse 330 corresponds to the amplified output of amplifier 116 (See FIG. 1) resulting from an input of pulse 306. The amount of amplification corresponds with the ratio of the peak amplitudes 340 and 320 corresponding to the outputs of the amplifier and the DAC respectively. The increase in frequency between pulse train 302 compared with pulse train 300 results from a decrease in the interval 312 between pulses rather than in a change in the duration of the pulse itself. This decreases the overall period 310 of the waveform without effecting the pulse duration. In an embodiment of the invention the duration of the pulse leading edge, peak dwell interval 314, and trailing edge 316 remains constant as frequency varies. After amplification the same durations are found for the leading edge, the peak dwell time 334 and the trailing edge 336 in the amplified waveform 330 as well.

The third of the pulse trains 304 shows high frequency train of pulses 308. Pulse 304 corresponds to the output of the D/A converter 114 (See FIG. 1) resulting from an input of the ordered sequence of numbers 204 shown in the previous FIG. 2 Pulse 360 corresponds to the amplified output of amplifier 116 (See FIG. 1) resulting from an input of pulse 308. The amount of amplification corresponds with the ratio of the peak amplitudes 370 at the output of the amplifier and the peak amplitude of pulse 308. The duration of the leading edge, the peak dwell time, and the trailing edge of this pulse also, in an embodiment of the invention, remains substantially constant as the frequency of the pulses is increased or decreased.

Figure 4:
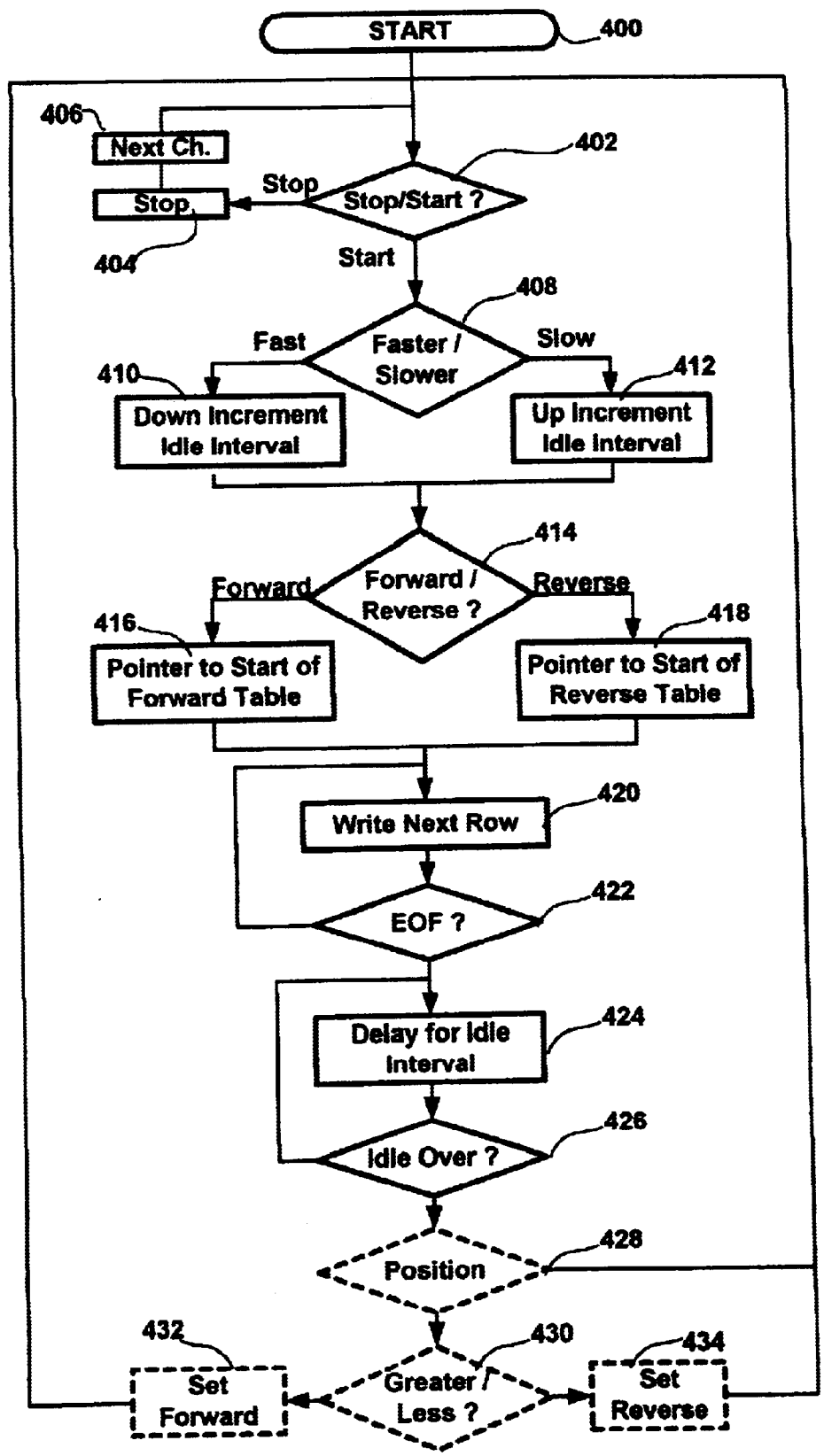
FIG. 4 is a process flow diagram showing the processes associated with the operation of an embodiment of the controller.

FIG. 4 is a process flow diagram showing the processes associated with the operation of an embodiment of the controller in which multiplexing of various piezo-electric assemblies is effected. Additionally in this embodiment closed loop feedback of position is effected along with alterations in the direction of movement and/or the speed of the corresponding driven member may be effected. The process flow diagram shows one embodiment of the ordering of these processes.

Processing commences at start block 400 in which downloading of new program code 120 (See FIG. 1) and/or updated or new control data 122 to the memory 112 (See FIG. 1) may take place. After initialization of any software or hardware registers etc. processing passes to decision block 402. In decision block 402 a determination is made as to whether motion of the driven member currently selected by the multiplexer 132 (See FIG. 1) is to start or stop. This determination may be based on the value in a register, a user input, or a comparison between a closed loop feedback of actual position with a desired position for the driven member. If a change in the position of the selected one of the multiplexed piezo-electric assemblies is called for control passes to decision process 408. If alternately no further motion for the selected assembly is required then control passes to stop block 404. In stop block 404 the piezo-electric actuator is temporarily shorted to a current sink 130 via switch 128. This avoids further drift of the selected actuator through a rapid discharge thereof. Then control is passed to next channel process 406 for the selection of the next of the multiplexed actuators after which control returns to decision block 402.

The processing of the selected one of the channels continues in decision block 408, in which a determination is made as to the required speed for the driven member. The speed of the driven member correlates with the frequency of pulses output by the amplifier. If a faster speed is required control passes to process 410 in which a register with a value corresponding to the duration of the idle interval 312 (See FIG. 3) between pulses is decremented. Alternately if a slower speed is called for control passes to process 412 in which the same register is up incremented. After either operation on the idle interval register control passes to decision block 414.

In decision block 414 a determination is made as to whether a forward/clockwise or reverse/counterclockwise motion of the selected driven member is called for. Depending on the outcome of the decision control may be passed to process 416 or process 418. In process 416 a pointer is set to the appropriate one of the two ordered sequences of numbers, e.g. sequence 204 for the selected actuator. Alternatively, in process 418 the pointer is set to the other of the two ordered sequences, e.g. sequence 214. In an alternate embodiment of the invention an appropriate function for generating the ordered sequence would be selected in either of these processes. In still another embodiment of the invention the pointer by which the processor 110 increments through the file could be initialized at the top or bottom of a single ordered sequence for subsequent reading in opposing directions. Subsequent to either processes 416 or 418 control passes to process 420.

In processes 420–422 the pointer controlled by the processor 110 (See FIG. 1) is incremented through the ordered sequence row by row until the end of the ordered sequence is detected in process 422. Control then passes to process 424.

At this point one pulse has been output by the processor to the input of the DAC 114 (SEE FIG. 1). Next in processes 424–426 a delay 312 (SEE FIG. 3) of an amount corresponding to the idle interval set in either of processes 410–412 above is injected into the output waveform This delay is the method by which the frequency of the composite waveform resulting from the pulses is varied in an embodiment of the invention. At the termination of the delay control passes to decision block 428 in which a determination is made as to whether closed loop position feedback and control is enabled. If not control returns directly to decision process 402 in which either the next channel is selected or the next pulse for the currently selected channel is output.

Figure 5:
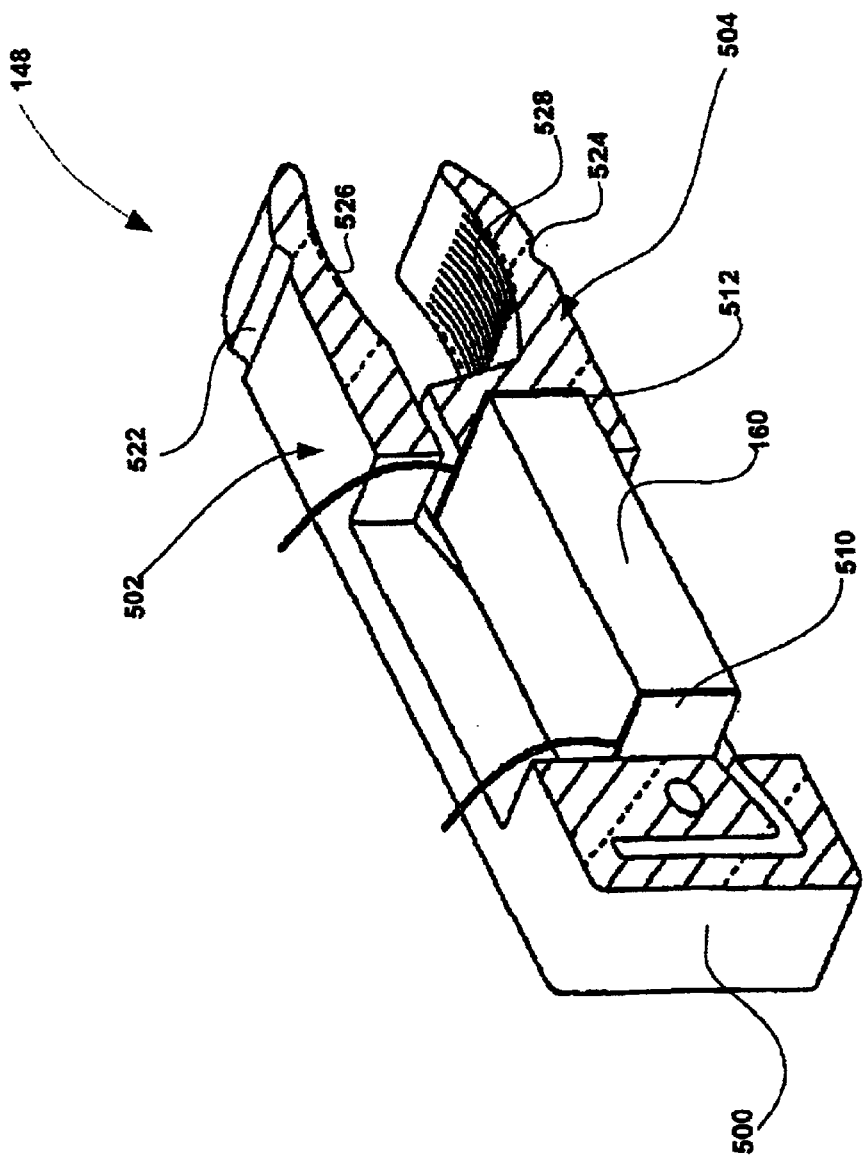
FIG. 5 is a detailed cross-sectional view of a first of the piezo-electric actuators shown in FIG. 1.

Alternately, where closed loop position feedback is enabled control passes to decision process 430. In decision process 430 a determination is made as to whether the actual position of the selected driven member corresponds with the desired position. Depending on the outcome of the comparison control will be passed to either of process blocks 432–434 for an appropriate setting of a forward or reverse register. This is the register read in process 414 discussed above. Control then returns to decision process 402 in which either the next channel is selected or the next pulse for the currently selected channel is output FIG. 5 is a detailed cross-sectional view of a first of the piezo-electric actuators 148 shown in FIG. 1. This actuator includes a piezoelectric element 160 having electrodes 512 and 510 at opposite ends with lead wires electrically connected thereto to allow the analog waveform output by the amplifier 116 (See FIG. 1) to be applied across piezoelectric element. A first end of the piezoelectric element adjacent electrode 510 is affixed to the base portion of the actuator frame (body), and an opposite end is affixed to a first movable jaw element 504, which co-acts with second movable jaw element 502 to engage a driven member 158 (See FIG. 1) held between the inner faces 528 and 526 of the jaws.

Resilient flexure connects base portion and the first movable jaw element to accommodate bi-directional lengthwise longitudinal motion of piezoelectric element 160. Such lengthwise motion of element 160 causes a longitudinal reciprocating motion of jaw elements, which in turn imparts a rotational motion to a cylindrical element, such as a threaded driven member e.g. adjustment screw, held between inner faces of the jaws. A pair of spring retention grooves 522–524 on the opposing outer surfaces of the jaws serve to position and retain a flat clamp spring 152, as shown in FIG. 1. This damp increases the pressure of the inner faces of the jaws against the cylindrical element, such as a threaded driven member, positioned between them. The actuator frame may be fabricated from suitable brass stock by means of conventional wire elector-discharge machining techniques. Flat damp sprint 152 may be fashioned from any material having suitable spring and fatigue characteristics.

Holes, extending through the actuator frame, are used during fabrication of the actuator to stretch the frame during cementing of the piezoelectric element 160 so that, after assembly, the piezoelectric element is under compression. This is done to avoid fracturing the bond between the frame and piezoelectric element when an electrical signal is applied to piezoelectric element.

Figure 6:
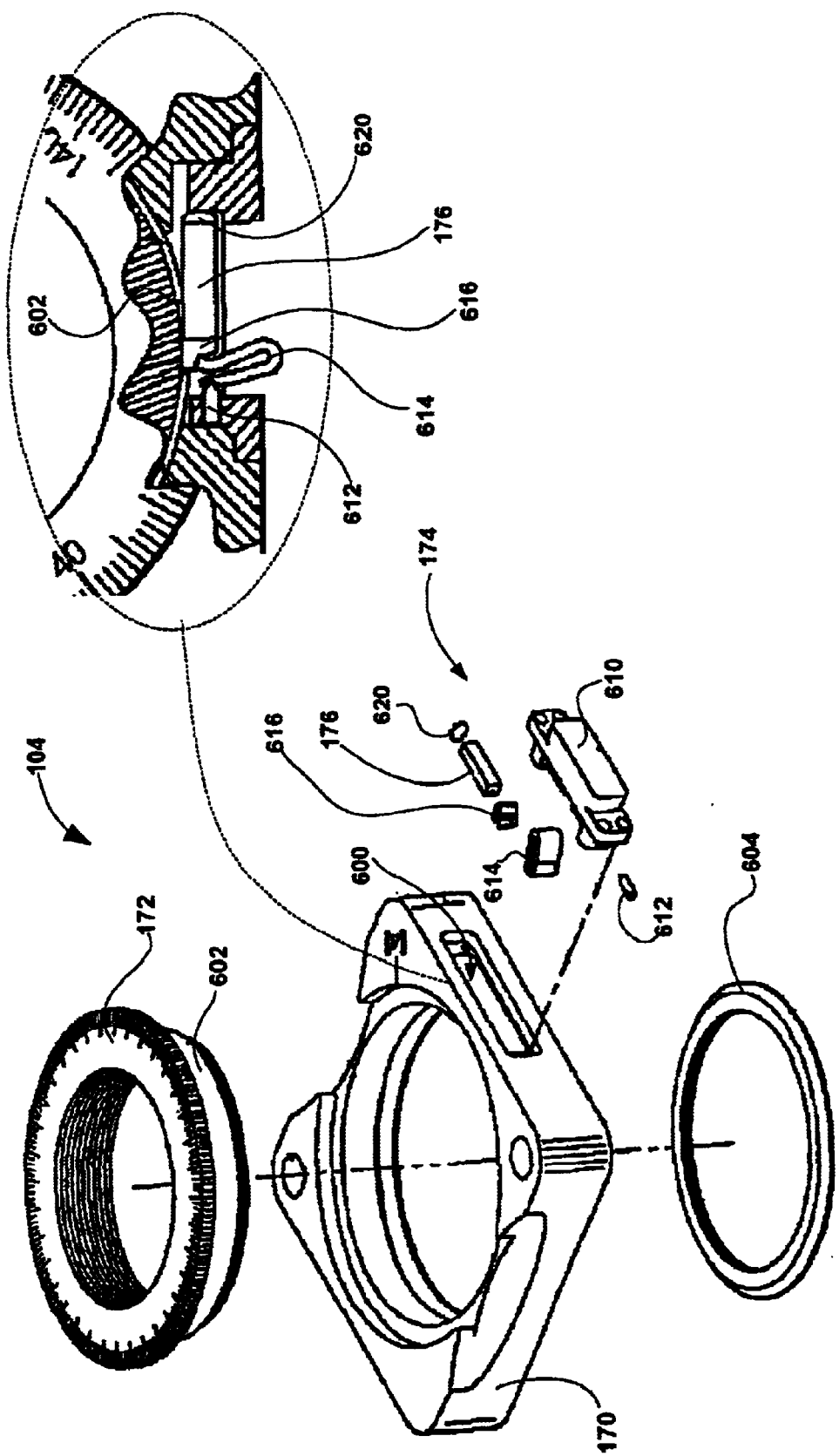
FIG. 6 is a detailed cross-sectional view of a second of the piezo-electric actuators shown in FIG. 1.

FIG 6 is a detailed cross-sectional view of the rotary piezo-electric actuators 174 shown in FIG. 1. The stainless steel rotatable stage member 172 has a complemaitary stainless steel lower member 604 each of which screwingly secure to each other. The rotatable stage member includes outer surface threads aligned beneath the outer cylindrical drive surface 602. Internal threads are located on the walls of an aperture within the rotatable stage member 172 to accommodate an optic or other device. Upper stage member and lower member have beveled bearing races which combine with a complementaly race in the base member 170 to provide a high precision, low friction ball bearing for rotation of stage member 172.

An actuator cut-out 600 in base member 170 accommodates a piezoelectric cover and frame element 610. The piezoelectric element 176 has a spherical cap 620 on a first end portion and a brass drive pad 616 on a second end portion. Spherical cap and drive pad may be affixed to piezoelectric element by suitable adhesive such as epoxy. Bias spring 614 fits between drive pad and the base is held in position by spring adjustment screw 612. The spherical cap 620 bears against the first opposing face of the base and allows motion of piezoelectric element 176 to accommodate runout of the rotary stage 172. The drive pad 616 has a bias spring retention means slot which accepts the tapered end of bias spring 614. The bias spring adjustment screw 612 has a tapered point and engages in the screw mount hole to engage one end of the bias spring. The bias spring is positioned to force drive portion of the drive pad into engagement with the cylindrical drive surface portion 602 of rotatable stage member and to simultaneously force the spherical cap of the piezoelectric element against frame element face.

The piezoelectric element is operative to effect reciprocating motion in the drive pad. The reciprocating motion of the drive pad developed by the piezoelectric element is converted to rotary motion of the optical stage by moving the drive pad relatively slowly in a first direction such that the coefficient of friction between the drive pad and the rotatable optical stage overcomes the inertial and rotational friction of the rotatable optical stage, causing the moveable optical stage to rotate slightly. The waveform is configured to maintain engagement between the drive pad and the rotatable optical stage to incrementally rotate the optical stage. When the limit of extension of the piezoelectric element is reached, the electrical drive signal is shifted to cause rapid movement of the drive pad in a second, opposite direction such that the inertial characteristics of the rotatable optical stage prevents the rotatable stage from following the drive pad motion and the drive pad slips against the rotatable optical stage.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for controlling at least one piezo actuator coupled frictionally with at least one positioning member to move the at least one positioning member in either of two directions as determined by relative rates of expansion and contraction of the at least one piezo actuator, and the method for controlling comprising the acts of:

storing data corresponding to digitized pulses each with a rising edge and a falling edge and with relative absolute values of corresponding average slopes of the rising edge and the falling edge of each of the digitized pulses corresponding with a selected direction of movement of the at least one positioning member;

moving the at least one positioning member in a selected one of the two direction by:

reading the data stored in the storing act;

iteratively writing digitized pulses with relative absolute values of the corresponding average slopes of the rising and falling edges of each pulse corresponding with the selected one of the two directions of movement;

converting the iteratively written digitized pulses to an analog waveform; and driving the at least one piezo actuator with the analog waveform thereby to move the at least one positioning member frictionally coupled with the at least one piezo actuator in the selected one of the two directions.

2. The method for controlling of claim 1, wherein the driving act further comprises:

switchably electrically coupling to a selected one of a plurality of piezo actuators each coupled frictionally with an associated driven member;

driving the selected one of the plurality of piezo actuators with the analog waveform to move the associated driven member of the selected one of the plurality of piezo actuators in the selected direction.

3. The method for controlling of claim 1 wherein the driving act further comprises the act of:

switchably coupling a current sink to the at least one piezo actuator to discharge the piezo actuator and arrest movement of the at least one positioning member in the selected direction.

4. The method for controlling of claim 1, wherein the storing act further comprises the act of:

storing at least one of an ordered sequence of numbers and a function for generating the ordered sequence of numbers with the ordered sequence of numbers corresponding with at least one of the digitized pulses.

5. The method for controlling of claim 1, wherein the data corresponds with an ordered sequence of numbers and wherein further the act of iteratively writing further comprises the act of:

reading the ordered sequence of numbers in a selected one of either of two opposing directions to move the at least one positioning member in a corresponding one of either of the two directions.

6. The method for controlling of claim 1, wherein the data includes a first ordered sequence of numbers for moving the at least one positioning member in a first of the two directions and a second ordered sequence for moving the at least one positioning member in a second of the two directions.

7. The method for controlling of claim 1, wherein the act of iteratively writing further comprises the acts to increase a speed of movement of the at least one positioning member of:

decreasing an interval between the iterative writing of each of the digitized pulses; and substantially maintaining a duration of each of the digitized pulses.

8. The method for controlling of claim 1, wherein the storing act further comprises the act of:

updating the data stored in the storing act with updated digitized pulses.

\* \* \* \* \*